United States Patent [19]

Hertz

[11] 3,707,897
[45] Jan. 2, 1973

[54] KEYBOARD TEACHING DEVICE
[75] Inventor: Sanford Hertz, Belleville, N.J.
[73] Assignee: GTR Products, Inc., Kenilworth, N.J.
[22] Filed: May 14, 1971
[21] Appl. No.: 143,329

[52] U.S. Cl.................................................84/479
[51] Int. Cl.............................................G09b 15/08
[58] Field of Search................84/471-472, 477-482, 84/485

[56] References Cited

UNITED STATES PATENTS

| | | | |
|---|---|---|---|
| 1,017,045 | 2/1912 | French et al. | 84/480 |
| 1,177,002 | 3/1916 | Wolfe | 84/480 |
| 1,270,657 | 6/1918 | Peters | 84/479 |
| 1,293,924 | 2/1919 | Reeve | 84/479 |
| 2,689,501 | 9/1954 | Nelson | 84/478 |
| 2,925,750 | 2/1960 | Capps | 84/473 |
| 3,185,015 | 5/1965 | Wencil | 84/478 |

Primary Examiner—Richard B. Wilkinson
Assistant Examiner—Lawrence R. Franklin
Attorney—John J. Lipari

[57] ABSTRACT

A teaching device for keyboard instruments for permitting an individual employing a numbers, alphabetical or other non-conventional musical system to freely and, at will, play keys in different octaves or registries on the keyboard. The device includes a body having a plurality of strips thereon, each strip containing markings consecutively disposed thereon for referring to the keys on the keyboard. Each strip is so arranged on the body that any one particular number common to each strip, will permit the player to play the key corresponding thereto in any desired octave or registry.

9 Claims, 2 Drawing Figures

PATENTED JAN 2 1973  3,707,897

INVENTOR
S. HERTZ
By John J. Ruffari
ATTORNEY

KEYBOARD TEACHING DEVICE

BACKGROUND OF THE INVENTION

This invention relates to keyboard musical instruments such as chord organs, pianos, etc., and, in particular, to a training or teaching device utilized to aid a player to play various octaves or registries of such musical instruments simply and quickly.

Systems employing numbers, symbols or characters as a substitute for conventional musical notes in sheet music have been known. Likewise, keys on a keyboard have been designated to correspond with the aforesaid numbers, symbols or characters, the keys generally being sequentially marked from left to right beginning with the first key of an octave or registry. The respective key designations have been located on each key or along the front portion of the piano or organ body disposed immediately adjacent to the front end of each key.

In accordance with the prior art system, the regular natural full tone keys are numbered, symbolized or lettered consecutively from left to right. Thus, if a numerical designation is used, the keys are numbered consecutively 1, 2, 3 etc. from left to right, the conventionally known key C being designated 1, the key D being designated 2, the key E being designated 3, etc. If an alphabetical system is employed, the keys are consecutively designated A, B, C, etc., from left to right, the conventionally known key C being designated A, the conventionally known key D being designated B, the conventionally known key E being designated C, etc.

The half-tone keys normally extend above the full tone keys and are located to the right of the conventionally known keys C, D, F, G and A, each of the half-tone keys in the system being identified with the natural key immediately to its left coupled with the usage of a prefix sign such as a plus (+), minus (−) or asterisk (*) so as to identify it as a half-tone key. For example, with a numerical system, the half-tone key conventionally known as C# (D♭) is designated +1, the conventionally known half-tone key D# (E♭) is designated +2, the conventionally known half-tone key F# (G♭) is designated +4.

With the above-discussed prior art systems, it was most difficult, if not impossible, for young children or amateur musicians to move from one octave or registry to another in order to produce variations of a particular song. For example, with a three octave chord organ, the natural keys under the number system would be consecutively numbered from 1–22, the numbers 1, 8, 15 and 22 representing the conventionally known key C in succeeding octaves. Thus, a player not having any musical knowledge but playing in response to a corresponding numbered musical composition would not know that the numbered notes 1, 8, 15 or 22 represented the same musical note, namely, the note C and accordingly, would only play the single numbered key designated by the numbered note in the music. Therefore, the player reading the numbered note 1 (conventional note low C) would only play numbered key 1, and not play numbered key 8 (middle C) or numbered key 15 (high C) or numbered key 22 (high, high C). Accordingly, the prior art training devices employed in the aforesaid systems were limited to teach a player to play a key in one octave or registry only, i.e., the octave or registry set forth in the particular numbered, lettered or symbolic sheet of music.

SUMMARY OF THE INVENTION

It is an object of this invention to provide an improved training device for permitting an individual, having an unfamiliarity with conventional musical notes, to freely and, at will, play keys in different octaves or registries by simply referring to the inventive training device.

Broadly, the invention is concerned with a training device for use with keyboard musical instruments and includes a body having thereon a first strip of successive numbers, letters, colors or symbols, hereinafter referred to as "markings," which correspond to successive keys of a keyboard, each of the successive markings on the first strip being in registry with its corresponding successive keys on the keyboard. A secomd strip of successive markings is located on the body and in alignment with the markings of the first strip, the initial marking on the second strip having the same designation as the initial marking on the first strip and being located in a row with the marking on the first strip which depicts the beginning of a second octave of markings thereon.

BRIEF DESCRIPTION OF THE DRAWING

Other objects and a fuller understanding of the invention may be had by referring to the drawings wherein FIG. 1 discloses a front view of one embodiment of the inventive device with a three octave chord organ.

DESCRIPTION OF THE PREFERRED EMBODIMENT

Figure 2:
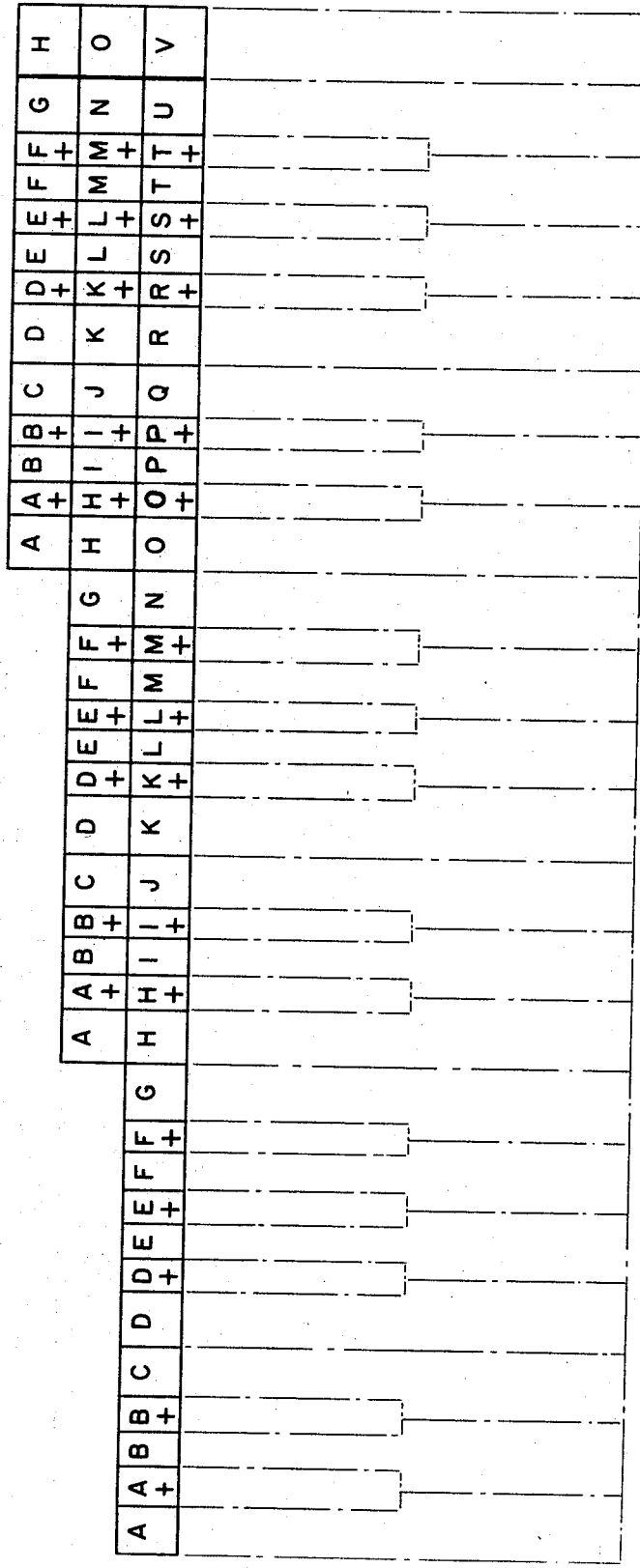
FIG. 2 illustrates another embodiment of the inventive device with a three octave chord organ.

With reference to the drawing, there is shown a conventional keyboard for a three octave chord organ, generally referred to as 10, each of the full tone natural keys and half-tone (sharps and flats) keys being referred to by their conventionally known notes starting from left to right; namely, C, D, E, etc.

Located to the front of the keyboard is the inventive training or teaching device, generally referred to as 11 and which is comprised of strips A, B and C respectively. For purposes of this description, a numbers system shall be described; however, it is understood that an alphabetical (FIG. 2) or other sequentially arranged symbolic system can also be employed without departing from the spirit and scope of the invention.

With particular reference to the training device, it can be seen that strip A is numbered consecutively from 1 to 22, each of the numbers representing the conventionally known keys C, D, E, etc., respectively. The numbers on the strip are located in alignment with the respective keys which they represent. Thus 1 represents key C, 2 represents key D, etc. The half-tones are related to the natural keys disposed to the left thereof by retaining the same number given to said natural key coupled with the addition of a symbol such as a plus (+) sign. Thus, the half-tone, conventionally known as C#, is designated +1; the half-tone, conventionally known as D#, is designated +2, etc.

A second strip, strip B, is located in alignment with strip A and provided with consecutively arranged numbers 1, 2, 3, etc. The first marking, number 1, on strip B, represents the start of the second octave or registry of the keyboard and is located in the same vertical row with number 8 of the first strip. Similarly, the remaining numbers on strip B are vertically aligned with numbers corresponding to strip A. Thus, number 2 of strip B is in alignment with number 9 of strip A, each of said numbers representing the conventionally known keys D. Accordingly, a player of the keyboard instrument, when reading the note 1 can play said note in either the first octave by referring to strip A or in the second octave by referring to strip B. It now is apparent that the whole song or any part thereof can be played in the first or second octave by simply referring to either strip A or B respectively.

Similarly, a third strip, strip C, is located in alignment with strips A and B and provided with consecutively arranged numbers 1, 2, 3, etc. The first marking, number 1, on strip C, represents the start of the third octave or registry of the keyboard and is located in the same vertical row with number 8 of strip B and number 15 of strip A. Similarly, the remaining numbers on strip C are vertically aligned with numbers corresponding to strips B and A. Thus, number 2 of strip C is in alignment with number 9 of strip B and number 16 of strip A, each of said numbers representing the conventionally known keys D. Accordingly, a player of the keyboard instrument, when reading the note 1 can play said note in either the first octave by referring to strip A or in the second octave by referring to strip B or in the third octave by referring to strip C. It is now apparent that the whole song or any part thereof can be played in the first, second or third octaves by simply referring to either strips A, B or C, respectively.

The aforesaid inventive device can be a part of the keyboard, or a part of the instrument adjacent to the front end of the keyboard. Also, the inventive device can be in the form of a decal or other body which may be fastened to the instrument or provided with an adhesive backing surface for adhering to the instrument.

While the inventive device has been described for use with a three octave keyboard instrument it should now be apparent that the device can be easily modified to accommodate any multi-octave keyboard instrument.

I claim:

1. A training device for use with keyboard musical instruments which comprises:
   a body,
   a first strip of successive markings located on the body and corresponding to successive keys of a keyboard, each of said successive markings on the first strip being in registry with its corresponding successive keys on the keyboard, and
   a second strip of successive markings located on the body and being in alignment with the markings of the first strip, the initail marking on the second strip having the same designation as the initial marking on the first strip and being located in the same row with the marking on the first strip which depicts the beginning of a second octave of markings thereon.

2. A training device, according to claim 1, which further includes:
   a third strip having a plurality of successive markings located on the body and being in alignment with the markings on the second strip, the initial marking on the third strip having the same designation as the initial markings on the first and second strips, and being located in the same row with the marking of the first strip which depicts the beginning of a third octave of markings thereon and with the marking of the second strip which depicts the beginning of the second octave of markings thereon.

3. A training device, according to claim 1, wherein the markings are consecutively disposed numbers.

4. A training device, according to claim 1, wherein the markings are consecutively disposed letters.

5. A training device, according to claim 1, wherein the said body is a portion of the keyboard instrument adjacently disposed to the keyboard.

6. A training device, according to claim 1, wherein the said body is of a material capable of being attached to the keyboard instrument.

7. A training device, according to claim 6, wherein the surface of the body opposite to the markings is provided with an adhesive for securing said body to the keyboard instrument.

8. A training device, for use with keyboard musical instruments, which comprises:
   a body,
   a first strip of successive markings located on the body and corresponding to successive keys of a keyboard, each of said successive markings on the first strip being in registry with its corresponding successive keys on the keyboard, and
   a second strip of successive markings located on the body and in alignment with the first strip of markings, the initial marking of the second strip being the same designation as the initail marking of the first strip and located in the same row with the 13th marking on the first strip.

9. A training device, according to claim 8, which includes:
   a third strip of successive markings located on the body and in alignment with the first and second strips of markings, the initial marking of the third strip being the same designation as the initial marking of the first and second strips and being located in the same row with the 13th marking of the second strip and the 26th marking of the first strip.

* * * * *